United States Patent

[11] 3,625,122

[72] Inventor Sergio F. Valdes
  Saugus, Calif.
[21] Appl. No. 46,262
[22] Filed June 15, 1970
[45] Patented Dec. 7, 1971
[73] Assignee International Telephone and Telegraph Corporation
  New York, N.Y.

[54] ELECTRONIC PULSE GENERATING AND CONTROL SYSTEM FOR SHUTTERING AN IMAGE INTENSIFIER
10 Claims, 3 Drawing Figs.

[52] U.S. Cl. ........................................... 95/1, 95/12.5, 250/213 VT
[51] Int. Cl. ........................................... G03
[50] Field of Search ........................................... 95/1, 125; 355/20; 250/213 VT

[56] References Cited
UNITED STATES PATENTS
2,060,977  11/1936  Boer et al. ................... 250/213 VT
FOREIGN PATENTS
1,454,478  10/1966  France ........................ 355/80

Primary Examiner—Samuel S. Matthews
Assistant Examiner—Richard L. Moses
Attorneys—C. Cornell Remsen, Jr., Walter J. Baum, Paul W. Hemminger, Charles L. Johnson, Jr. and Thomas E. Kristofferson ABSTRACT: An automatic camera shuttering system particularly adapted for aerial photography in that it is continuously operative over a wide range of ambient light levels on a frame-to-frame basis. The scene to be photographed is imaged on a photo-cathode surface, passed through an electron image intensifier and thereafter imaged in intensified form on an output phosphorescent screen adjacent to the film.
During each frame, a shuttering pulse of a duration which is a function of the output of a light measuring transducer, is generated and applied to the image intensifier to control the intensified image "on time."
The light transducer output is broken into a plurality of decade ranges and the pulse generating circuit is thereby adapted to handle wide variations of light and generate correspondingly inversely related shuttering pulse durations.

INVENTOR.
SERGIO F. VALDES
BY William F. O'Neil
AGENT 3,625,122

ELECTRONIC PULSE GENERATING AND CONTROL SYSTEM FOR SHUTTERING AN IMAGE INTENSIFIER

BACKGROUND OF THE INVENTION

1. Field of the Invention

The invention relates to photographic equipment and more specifically, to a system using an electronic image intensifier with automatic electronic shuttering.

2. Description of the Prior Art

In the photographic arts, the problem of providing variable film exposure time as a function of the illumination of the scene to be photographed is fundamental. Automatic systems responsive to the light received by a photocell or other light transducer acting as a light meter to adjust the iris of a lens system for this purpose, are known.

In the specialized art of aerial photography certain unique problems present themselves especially in the field of aerial reconnaissance. In that connection it is often necessary to photograph ground area which are illuminated at very low-light intensities. Moreover, in a surveillance flyover, large variations in the illumination of the scene to be photographed may be encountered on a frame-to-frame basis.

Image intensifiers, per se, are known. These devices rely basically on the conversion of a light pattern, as for example, from a photocathode into an amplified corresponding electron pattern which is presented anew as intensified visible light on a phosphorescent output screen or surface. U.S. Pat. Nos. 3,387,137 and 3,449,582 are typical of the art in image intensifiers of the secondary emission multiplication type. The amplification of the electronic pattern may be accomplished through the use of secondary emissive devices or by other techniques. It is possible to effect substantial power gain in the electron pattern emitted from the photocathode, simply through acceleration of electrons by electrostatic field techniques, etc. Either of the aforementioned general types of image intensifier are inherently adapted for use with the present invention. Other types of image intensifiers may also be used so long as light transmission is subject to control through application of a voltage or current pulse of appropriate duration.

The solution to the problems of the prior art provided by the present invention will be understood as this description proceeds.

SUMMARY OF THE INVENTION

The general requirements for aerial photography at low-light levels and widely varying light levels suggest the use of image intensifiers. In the present invention an image intensifier is employed and is on-off controlled by an exposure or shuttering pulse generated in accordance with a function of the output of a light meter or transducer. Ordinarily, although not mandatorily, the said function will be linear corresponding to the normal photographic film response as a linear integrator within reasonable limits. A film transport mechanism, which may be automatic or manually operated, is arranged to produce a synchronizing pulse every time the film has been transported to present a new frame. The said synchronizing pulse is generated when the film has come to rest and the shuttering pulse begins essentially at the time of stabilization of the film transport mechanism. Since it is most convenient to provide a mechanically related synchronizing pulse during the time the film transport mechanism is operating prior to its rest position at the beginning of each new frame. Correspondingly, it is convenient to employ a fixed delay between the synchronizing pulse and circuits to initiate the shuttering pulse so that the latter is guaranteed to occur after stabilization of the new film frame.

The light transducer is of a type which produces an output voltage as a function (generally linearly) of the light level from very low levels to the most intense levels of sun illumination. The output of the light transducer is fed to a plurality (two in the illustrated case) of decade amplifier stages in cascade. Accordingly, light analog signals in at least three different decade scales are provided. A corresponding number of negative AND gates are provided and are electrically interlocked so that an output of the said light analog signal is utilized from only one of the decade values at a time. Each of the negative AND gates feeds an integrator circuit where the time integral of the light analog signal is obtained for each of the decade ranges aforementioned. The constant of integration in each of these integrators varies in accordance with the significance of the corresponding decade signal input.

An appropriate threshold sensing device fires or changes state at the time when the said integral crosses over a predetermined level. At that time, the said shuttering pulse, which was started an initial time delay after the film transport synchronizing pulse, is terminated. Obviously, the decade range corresponding to the largest ambient light condition will require the shortest integration time constant, and therefore will cause the integrated analog light value to pass through the aforementioned threshold more quickly than would be the case for an integrator corresponding to a lower level light decade. It follows that the duration of said shuttering pulse is caused to be inversely proportional to the value of the said analog light value signal over the full output range of the light transducer.

The nature of the circuits and components required to instrument the system will be more fully understood in connection with the description of the preferred embodiment hereinafter.

DESCRIPTION OF THE PREFERRED EMBODIMENT

Figure 1:
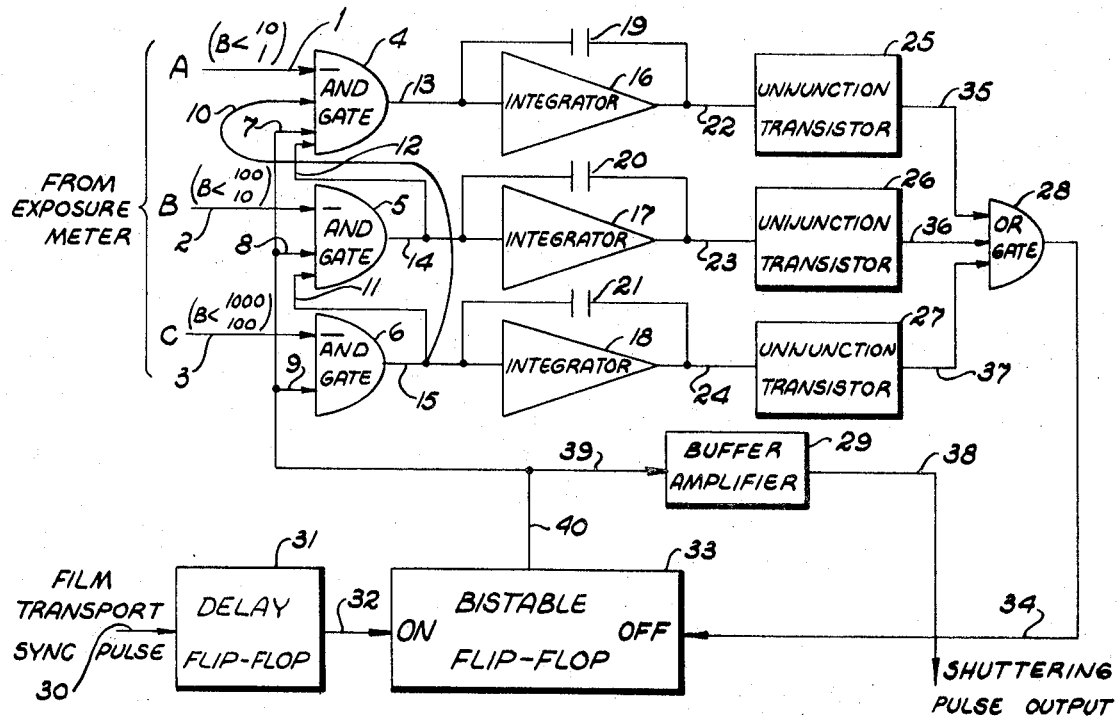
FIG. 1 is a block diagram of the shuttering pulse generator according to the present invention.

Referring first to FIG. 1, a diagram of the essential elements of the shuttering pulse generator is depicted. The inputs A, B and C which are applied to the input terminals 1, 2, and 3 respectively are the decade inputs from the light metering circuit of FIG. 2. Before fully discussing the circuit of FIG. 1 it is considered desirable to digress to FIG. 2 so that the nature of the inputs A through C and D will be fully understood as background for the discussion of FIG. 1.

Figure 2:
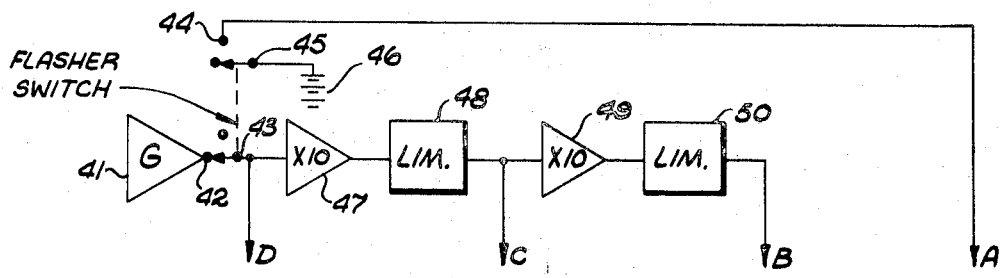
FIG. 2 is a block diagram of the light meter (transducer) and decade amplifiers for producing the several decade ranges of the analog light signal.

In FIG. 2, the output of the photocell or light transducer 41 is supplied through switch terminals 42 and 43 to a stabilized amplifier 47, and also to terminal D. The so-called flasher switch will be seen to be a double-pole, double-throw device, illustrated as it would be positioned in the nonflasher mode of operation. Two decade amplifiers with corresponding limiters on their outputs are illustrated as amplifier 47 with its limiter 48 and amplifier 49 with its limiter 50. The basic light analog signal from 41 is available at terminal D and terminal C and B provide 10 and 100 times the level of the D signal respectively. As the light level is increased from a dark or near dark condition, the first of these signals to be useful will be that at B. Assuming that the light level steadily increased the signal at B would reach a point where it was limited by limiter 50 and could not increase further. The signal at C however would continue to increase until limited by the limiter 48, while the signal D at points 42 and 43 would continue to increase until it reached the full saturation value from transducer 41. The remaining functions and structure of FIG. 2 will be described later in this specification.

Referring again to FIG. 1, the application of the exposure metering signals from FIG. 2 on the inputs 1,2 and 3 to the negative AND-gates 4, 5 and 6, respectively, can be related between FIGS. 1 and 2.

The film transport synchronizing pulse at 30 will be well understood from the foregoing and the description to follow. A delay flip-flop 31 introduces a constant delay so that the pulse at 32 is assured of being well within the quiescent period of the film transport (i.e., does not occur while the film transport is still in motion in the frame changing operation). Accordingly, a bistable flip-flop 33, which generates the actual shuttering pulse at output 40, is triggered by the pulse at 32. This pulse at lead 40 is supplied to the buffer amplifier 29 by a lead 39 and also to the individual negative AND-gates 4, 5 and 6 at leads 7, 8 and 9, respectively. The output of the buffer amplifier 29 on lead 38 is the actual shuttering pulse output and may be presumed to be supplied at whatever voltage and power levels are required for operation of the image intensifier (see FIG. 3).

The beginning of the shuttering pulse supplied, as indicated at 7, 8 and 9 to the negative AND gates, operates as a switching function to enable the said negative AND gates. Accordingly, until the shuttering pulse has begun at lead 40, the gates 4, 5 and 6 are disabled and no output is obtained at 13, 14 and 15, irrespective of other signal conditions.

It should be pointed out that the negative AND-gates 4, 5 and 6 are not ordinary logic gates with binary outputs since they are required to pass the respective inputs 1, 2 and 3 to outputs 13, 14 and 15, proportionally. Thus, they may be thought of as being gated, unity-gain amplifiers responding proportionally to the signals at 1, 2 and 3. produces Depending upon which of the analog light level signals from the exposure meter circuit of FIG. 2 corresponds to the ambient light level extant at any time, a corresponding one of the integrators 16, 17 or 18, is permitted to integrate its input signal (either 13, 14 or 15) to produce a time integral of the light level analog signal at 22, 23 or 24. The said integrators are of a form well known in the analog computer arts and each comprise an operational amplifier with capacitive feedback. The capacitors 19, 20 and 21 are scaled in decade values so that the integrator corresponding to the lowest light level integrates most slowly, and, as will be seen, results in the longest shuttering pulse. In order to prevent multiple integration and control of the shuttering pulse duration, electrical interlocks are provided, such that the gate 5 output is connected to a disabling input on the gate 4 at lead 12, and the gate 6 is connected to disable both gates 4 and 5 via leads 11 and 10 respectively. This arrangement produces an interlock so that the lower light level integrator inputs will be shutoff in the presence of higher light level signals. Unijunction transistors 25, 26 and 27 respond to the signals 22, 23 and 24, respectively. These unijunction transistor circuits have a threshold of triggering or change of state, such that there will be an output signal at 35, 36 or 37, depending upon which integrator is permitted to operate as aforesaid. The OR-gate 28 passes any one of these unijunction transistor circuit outputs to its output lead 34, providing a shutoff signal to the bistable flip-flop 33, thereby terminating the shuttering pulse duration is inversely proportional to the scene brightness.

Leads 59, 60 and 61 convey reset pulses produced by the respective unijunction transistor circuits 25 through 27, at the time of their triggering for resetting each corresponding integrator.

The exposure meter circuit of FIG. 2 also contains provision for operation with a flasher. When the so-called flasher-switch (see FIG. 2) is positioned for flasher operation, the point 43 is disconnected from 42 and accordingly, no outputs are extant at terminals B, C and D. Terminal A will, however, exhibit a fixed voltage from the source 46, since the switch on 45 will have been switched to point 44. This operation provides a fixed voltage to the shuttering pulse generator circuit of FIG. 1, so that the shuttering pulse generated is predetermined and is appropriate in duration for flasher operation. Under those circumstances, changes in ambient light level are not a factor in operation of the system since the illumination of the scene is constant with each flash. The said fixed voltage controls the shuttering pulse to a duration bracketing the flash in each frame cycle.

The limiters 48 and 50 may be simple, biased diodes or Zener diodes and the entire instrumentation of FIG. 1 and 2 can readily be microminiaturized in the form of integrated circuits circuits which occupy a few cubic inches, at most. Moreover, the total power drain for such circuits need amount to only an inconsequential few watts.

Figure 3:
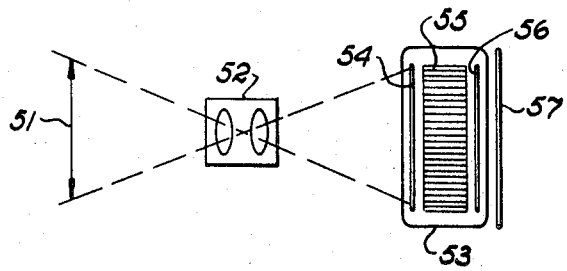
FIG. 3 is a block diagram illustrating the relation of the light intensifier to the camera lens, film and film transport device.

FIG. 3 depicts the essentials of the camera and light intensifier arrangement. If 51 represents the distant scene to be photographed and 52, the imaging lens for emplacing an image of suitable definition on the photocathode surface 54, the image intensifier device 55 will, during the presence of a pulse of predetermined voltage and power level at 38, produce an intensified image on the phosphorescent screen 56. The elements 54, 55 and 56 are enclosed in a transparent evacuated envelope 53. The film 57 is thus positioned in direct light contact as close as is practical to the phosphorescent screen 56. The block 58 represents the film transport mechanism (a well-known mechanism per se) with sync pulse output 30.

As has been indicated previously, more than one type of electron image intensifier may be used in the system of the present invention, provided its operation as an intensifier is controllable by a pulse of appropriate voltage and power level as described. An image intensifier of the secondary emission type as described in U.S. Pat. No. 3,387,137 is appropriate for use in the present invention. It will be understood from that prior art reference that a voltage pulse, on the order of 5,000 volts amplitude would be required at the intensifier pulse inputs 38.

Various modifications of the details of instrumentation of the invention will suggest themselves to those skilled in this art. It is not intended that the scope of the appended claims should be limited by the specifics of the drawing and description, these being illustrative only.

What is claimed is:

1. In a light pattern transmission system, including a photocathode for converting said light pattern to a corresponding electron emission pattern, and a secondary emission electron multiplier responsive to said electron emission to provide an intensified electron emission pattern to a conversion device, the combination comprising:
light metering means for continuously monitoring the light intensity of said light pattern to produce a light intensity analog signal;
means for producing an electric pulse of predetermined intensity and of a duration which is a function of said light intensity analog signal;
and means for applying said voltage pulse to said secondary emission electron multiplier to make it operative for the duration of said voltage pulse, thereby to provide automatic electronic shuttering of the light path through said light pattern transmission system.

2. An automatic electronic shuttering arrangement for a camera system having an optical transmission device for imaging a distant scene within said camera, and a film transport means, comprising:
a photocathode surface arranged with respect to said optical transmission device so that said imaging occurs on said photocathode surface to produce a corresponding first pattern of electron emission;
an image intensifier responsive to said pattern of electron emission for generating a second pattern of electron emission which is an intensified replica of said first pattern;
a conversion surface responsive to said second pattern of electron emission for producing an intensified image of said distant scene thereon;
light metering means for developing at least one light analog signal as function of the light intensity reflected from said distant scene;
pulse generating means responsive to said light analog signal for generating a shuttering pulse of variable duration as a predetermined function of said reflected light intensity;
and means for applying said voltage pulse to produce an electric field of like duration across said image intensifier in the direction of electron travel therethrough, whereby said intensifier is operative substantially only during said shuttering pulse.

3. Apparatus according to claim 2, including a photographic film arranged to record the light pattern emitted by said conversion surface, film transport means for advancing said photographic film after each exposure thereof, and means associated with said film transport means for generating a synchronizing pulse at a time when said photographic film is at rest after each advance, said synchronizing pulse being connected to said pulse generating means for initiating said shuttering pulse.

4. The invention according to claim 3 in which said image intensifier is defined as being of the secondary emission electron multiplier type.

5. Apparatus according to claim 3 in which said light metering means includes a transducer providing an output signal varying over the full range of light from said distant scene, and a plurality of serially connected decade amplifiers are also provided, whereby the output of each of said amplifiers constitutes a discrete decade range of values of said light intensity analog signal.

6. Apparatus according to claim 5 in which said pulse generating means comprises a plurality of integrating means, one such integrator for each of said decade amplifier outputs, a corresponding plurality of switching circuits each connected to change state at the crossover of the signal output of a corresponding integrator with respect to a predetermined signal threshold, and means connected to terminate said shuttering pulse whenever any of said switching circuits changes state.

7. Apparatus according to claim 6 in which there are included:
   a bistable gate circuit for generating said shuttering pulse, and means for applying said film transport synchronizing pulse to produce a first change of state in said bistable gate circuit, thereby initiating said shuttering pulse.

8. Apparatus according to claim 7 in which said means connected to terminate said shuttering pulse comprises an "OR" circuit responsive to all of said switching circuit outputs connected to produce a second change of state in said bistable gate circuit, thereby terminating said shuttering pulse.

9. The invention defined in claim 8 further defined in that each of said integrator inputs is preceded by an input gate circuit, said input gate circuits each having a first control input connected to the output of said bistable gate circuit whereby said input gate circuits are blocked except when said bistable gate is in said first change of state condition corresponding to existence of said shuttering pulse.

10. The invention set forth in claim 9 in which said input gate circuits have additional control inputs interconnected with the outputs of a portion of said input gate outputs whereby all input gate circuits corresponding to decade light ranges below the one corresponding to the light level extant at any particular time are blocked.

* * * * *